United States Patent
Kitamura et al.

(10) Patent No.: US 10,402,997 B2
(45) Date of Patent: Sep. 3, 2019

(54) DISPLACEMENT DETECTING APPARATUS, DISPLACEMENT DETECTING METHOD AND SUBSTRATE PROCESSING APPARATUS

(71) Applicant: SCREEN Holdings Co., Ltd., Kyoto (JP)

(72) Inventors: Kazuhiro Kitamura, Kyoto (JP); Hiroaki Kakuma, Kyoto (JP)

(73) Assignee: SCREEN Holdings Co., Ltd. (JP)

( * ) Notice: Subject to any disclaimer, the term of this patent is extended or adjusted under 35 U.S.C. 154(b) by 8 days.

(21) Appl. No.: 15/333,812

(22) Filed: Oct. 25, 2016

(65) Prior Publication Data

US 2017/0116721 A1    Apr. 27, 2017

(30) Foreign Application Priority Data

Oct. 27, 2015    (JP) .................... 2015-210879

(51) Int. Cl.
*G06K 9/62*    (2006.01)
*G06T 7/73*    (2017.01)

(52) U.S. Cl.
CPC .............. *G06T 7/73* (2017.01); *G06K 9/6202* (2013.01); *G06T 2207/30148* (2013.01); *G06T 2207/30204* (2013.01)

(58) Field of Classification Search
None
See application file for complete search history.

(56) References Cited

U.S. PATENT DOCUMENTS

| | | | |
|---|---|---|---|
| 5,157,734 A | 10/1992 | Chen et al. | 382/8 |
| 6,203,082 B1 * | 3/2001 | Bendat | B25J 15/0616 29/743 |
| 9,975,247 B2 * | 5/2018 | Okita | G06T 7/74 |

(Continued)

FOREIGN PATENT DOCUMENTS

| CN | 1498691 A | 5/2004 |
|---|---|---|
| CN | 1526157 A | 9/2004 |

(Continued)

OTHER PUBLICATIONS

Office Action dated Oct. 18, 2017 for corresponding Taiwanese Patent Application No. 105132351.

(Continued)

*Primary Examiner* — Andrae S Allison
(74) *Attorney, Agent, or Firm* — Ostrolenk Faber LLP

(57) ABSTRACT

This invention is to provide a technique capable of detecting a displacement of a positioning object with respect to a reference position in an actual space with high accuracy. A position of an imaging object detected in an imaged image is converted into a displacement of the positioning object with respect to the reference position in the actual space based on conversion information representing a correlative relationship between the position of the imaging object in the image and the displacement of the positioning object from the reference position. The conversion information is determined in advance based on positions of the imaging object detected from a plurality of images respectively imaged with the positioning object positioned at each of a plurality of imaging positions.

3 Claims, 11 Drawing Sheets

(56) References Cited

U.S. PATENT DOCUMENTS

| | | | |
|---|---|---|---|
| 2002/0079461 A1* | 6/2002 | Kirschstein | G03F 7/707 250/442.11 |
| 2002/0130262 A1* | 9/2002 | Nakasuji | G01N 23/225 250/311 |
| 2002/0167649 A1* | 11/2002 | Heinle | G03B 27/42 355/53 |
| 2003/0058432 A1* | 3/2003 | Drake | G01N 21/47 356/237.1 |
| 2003/0156757 A1* | 8/2003 | Murakawa | G06K 9/4609 382/195 |
| 2004/0135830 A1 | 7/2004 | Kamiyama et al. | 347/9 |
| 2004/0186622 A1 | 9/2004 | Aiuchi et al. | 700/241 |
| 2005/0116979 A1 | 6/2005 | Takano | 347/19 |
| 2006/0158632 A1 | 7/2006 | Yasuda et al. | 355/55 |
| 2006/0187432 A1* | 8/2006 | Yasuda | G03F 7/70341 355/53 |
| 2008/0225067 A1* | 9/2008 | Morino | B41J 29/38 347/14 |
| 2009/0159808 A1* | 6/2009 | Bowering | B82Y 10/00 250/372 |
| 2010/0134556 A1 | 6/2010 | Kojima | 347/30 |
| 2011/0149062 A1* | 6/2011 | Campidell | G01J 5/0003 348/87 |
| 2012/0147379 A1* | 6/2012 | Choi | G01J 9/02 356/453 |
| 2012/0257176 A1* | 10/2012 | Hayashi | H01L 21/67259 355/27 |
| 2015/0028506 A1* | 1/2015 | Sato | G03F 7/0002 264/40.1 |
| 2015/0235368 A1* | 8/2015 | Kakuma | G06T 7/254 348/135 |
| 2015/0270146 A1 | 9/2015 | Yoshihara et al. | 134/18 |
| 2015/0281654 A1* | 10/2015 | Miyazaki | G01B 11/0616 348/86 |
| 2016/0091892 A1* | 3/2016 | Okita | G06T 7/74 700/121 |
| 2016/0143529 A1* | 5/2016 | Miyashita | A61B 3/152 351/208 |
| 2017/0251920 A1* | 9/2017 | Tokuda | A61B 3/152 |

FOREIGN PATENT DOCUMENTS

| | | |
|---|---|---|
| JP | S61-000877 | 1/1986 |
| JP | H06-249615 | 9/1994 |
| JP | H07-012517 | 1/1995 |
| JP | 2003-050106 | 2/2003 |
| JP | 2011-069797 | 4/2011 |
| JP | 2015-096830 | 5/2015 |
| JP | 2015-152475 | 8/2015 |
| TW | 201314386 A | 4/2013 |
| TW | 201324585 A1 | 6/2013 |
| TW | 201539625 A | 10/2015 |

OTHER PUBLICATIONS

Notice of Allowance dated Mar. 19, 2019 issued in corresponding Japanese Patent Application No. 2015-210879.

* cited by examiner

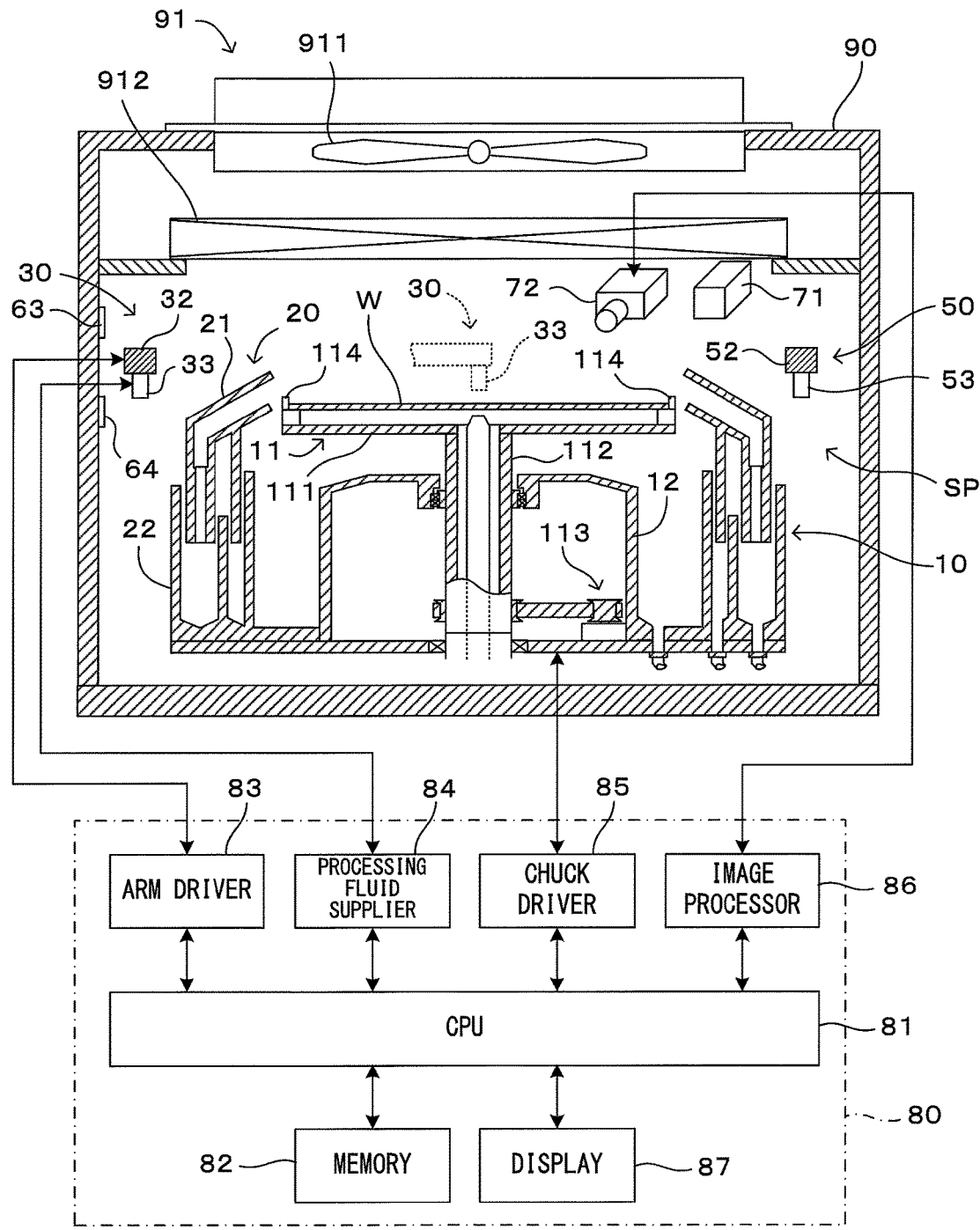
F I G. 3

FIG. 11

| NOZZLE NUMBER | REFERENCE POSITION | | |
|---|---|---|---|
| | A | B | C |
| 1 | F1a(X) | F1b(X) | F1c(X) |
| 2 | F2a(Y) | F2b(Y) | F2c(Y) |
| 3 | F3a(X, Y) | F3b(X, Y) | F3c(X, Y) |

DISPLACEMENT DETECTING APPARATUS, DISPLACEMENT DETECTING METHOD AND SUBSTRATE PROCESSING APPARATUS

CROSS REFERENCE TO RELATED APPLICATION

The disclosure of Japanese Patent Application No. 2015-210879 filed on Oct. 27, 2015 including specification, drawings and claims is incorporated herein by reference in its entirety.

BACKGROUND OF THE INVENTION

1. Field of the Invention

This invention relates to a technique for detecting a displacement of a movable positioning object with respect to a reference position.

2. Description of the Related Art

As a technique for detecting the position of a movable positioning object or determining whether or not the positioning object is positioned at a designated position, the positioning object is imaged using an imager such as a camera and the position of the positioning object in an image is detected by an image analysis. For example, in a technique described in JP 2015-152475A, a processing nozzle configured to be movable with respect to a substrate and discharge a liquid or the like is a positioning object. A displacement amount in an actual space is approximately obtained by multiplying a displacement amount of the processing nozzle in an image imaged by the camera by a proportionality coefficient corresponding to an imaging magnification.

In the above conventional technique, whether or not the positioning of the nozzle as the positioning object is good is determined based on whether or not the displacement amount of the positioning object with respect to a proper position designated in advance as a reference is within an allowable range. The displacement amount to be evaluated this time is the one in the actual space, but not the one in the imaged image. A relationship between the displacement amount in the actual space and that in the image is not necessarily linear due to a moving mode of the positioning object and a positional relationship with the imager. Thus, detection accuracy may be insufficient in some cases with the method for obtaining the displacement amount in the actual space by multiplying the displacement amount in the image by the proportionality coefficient.

SUMMARY OF THE INVENTION

This invention was developed in view of the above problem and an object thereof is to provide a technique capable of detecting a displacement of a positioning object with respect to a reference position in an actual space with higher accuracy than before.

To achieve the above object, one aspect of this invention is directed to a displacement detecting apparatus with a mover which moves and positions a positioning object to a plurality of positions, an imager which images an image including an imaging object using the positioning object as the imaging object or using an object configured to be integrally displaced with the positioning object as the imaging object, a displacement detector which detects the imaging object from the image imaged by the imager and detects a displacement of the positioning object with respect to a predetermined reference position based on a position of the imaging object detected in the image and an information holder which holds conversion information representing a correlative relationship between the position of the imaging object in the image and the displacement of the positioning object from the reference position, wherein the conversion information is determined based on positions of the imaging object detected from a plurality of images respectively imaged by the imager with the positioning object positioned at each of a plurality of imaging positions by the mover, the displacement from the reference position is known for each of the imaging positions, and the displacement detector converts the position of the imaging object detected in the image into the displacement of the positioning object with respect to the reference position based on the conversion information.

Further, to achieve the above object, another aspect of this invention is directed to a displacement detecting method for detecting a displacement of a positioning object moved by a mover from a reference position, the displacement detecting method comprising imaging an image including an imaging object using the positioning object as the imaging object or using an object configured to be integrally displaced with the positioning object as the imaging object and detecting the imaging object from the image imaged, detecting a displacement of the positioning object with respect to a predetermined reference position based on a position of the imaging object detected in the image, wherein the position of the imaging object detected in the image is converted into a displacement of the positioning object with respect to the reference position based on conversion information representing a correlative relationship between the position of the imaging object in the image and the displacement of the positioning object from the reference position and the conversion information is determined based on positions of the imaging object detected from a plurality of images respectively imaged with the positioning object positioned at each of a plurality of imaging positions whose displacements from the reference position are known.

In the invention thus configured, the displacement of the positioning object is detected based on the imaged images. The detection of the position in the image at this time may be directly performed for the positioning object included in the image. Further, the position of the positioning object may be indirectly obtained by performing the position detection for another object in the image configured to be integrally displaced as the positioning object is displaced. That is, the object imaged for the purpose of detecting the position in the image may be the positioning object itself or may be another object configured to be integrally displaced with the positioning object. Here, an object which is included in an image to be imaged and whose position is to be detected is called an "imaging object".

In the invention, imaging is performed with the positioning object positioned at each of the plurality of imaging positions whose displacements from the reference position are known. The conversion information is obtained from a correlation between the position of the imaging object included in the image and the actual position of the positioning object at that time. Thus, when the positioning object is positioned at a certain position, the displacement of the positioning object from the reference position in an actual space is accurately obtained by conversion from the position of the imaging object in the image.

Further, still another aspect of this invention is directed to a substrate processing apparatus with a holder which holds a substrate, a processing nozzle which discharges a fluid for processing the substrate to the substrate and the displacement detecting apparatus described above using the processing nozzle as the positioning object. In such an invention, the position of the processing nozzle with respect to the substrate is accurately obtained from an image. Thus, the processing for the substrate can be performed with the position of the processing nozzle properly managed, and the process can be satisfactorily performed.

As described above, according to the displacement detecting apparatus and the displacement detecting method of the invention, the displacement of the positioning object from the reference position in the actual space can be accurately obtained from the position of the imaging object detected in the imaged image. Further, in the substrate processing apparatus of the invention, the process can be satisfactorily performed by properly managing the position of the processing nozzle.

The above and other objects and novel features of the invention will become more apparent if the following detailed description is read with reference to the accompanying drawings. However, the drawings are for the purpose of illustration only and are not intended to limit the scope of this invention.

BRIEF DESCRIPTION OF THE DRAWINGS

FIG. 3 is a drawing showing the cross section of FIG. 2 taken along the arrow A-A and shows the structure of the controller of the substrate processing unit.

FIG. 11 is a drawing showing an example of the correction table.

DETAILED DESCRIPTION OF THE PREFERRED EMBODIMENTS

A substrate processing system comprising a substrate processing apparatus to which the invention is applicable will now be briefly described. In the following, a substrate may be any one of various types of substrates such as a semiconductor substrate, a glass substrate for photo mask, a glass substrate for liquid crystal display, a glass substrate for plasma display, a substrate for FED (Field Emission Display), an optical disk substrate, a magnetic disk substrate and a magneto-optic disk substrate. While the following will describe as an example a substrate processing system used primarily for processing of a semiconductor substrate with reference to drawings, the invention is applicable to processing of various types of substrates mentioned above.

Figure 1:
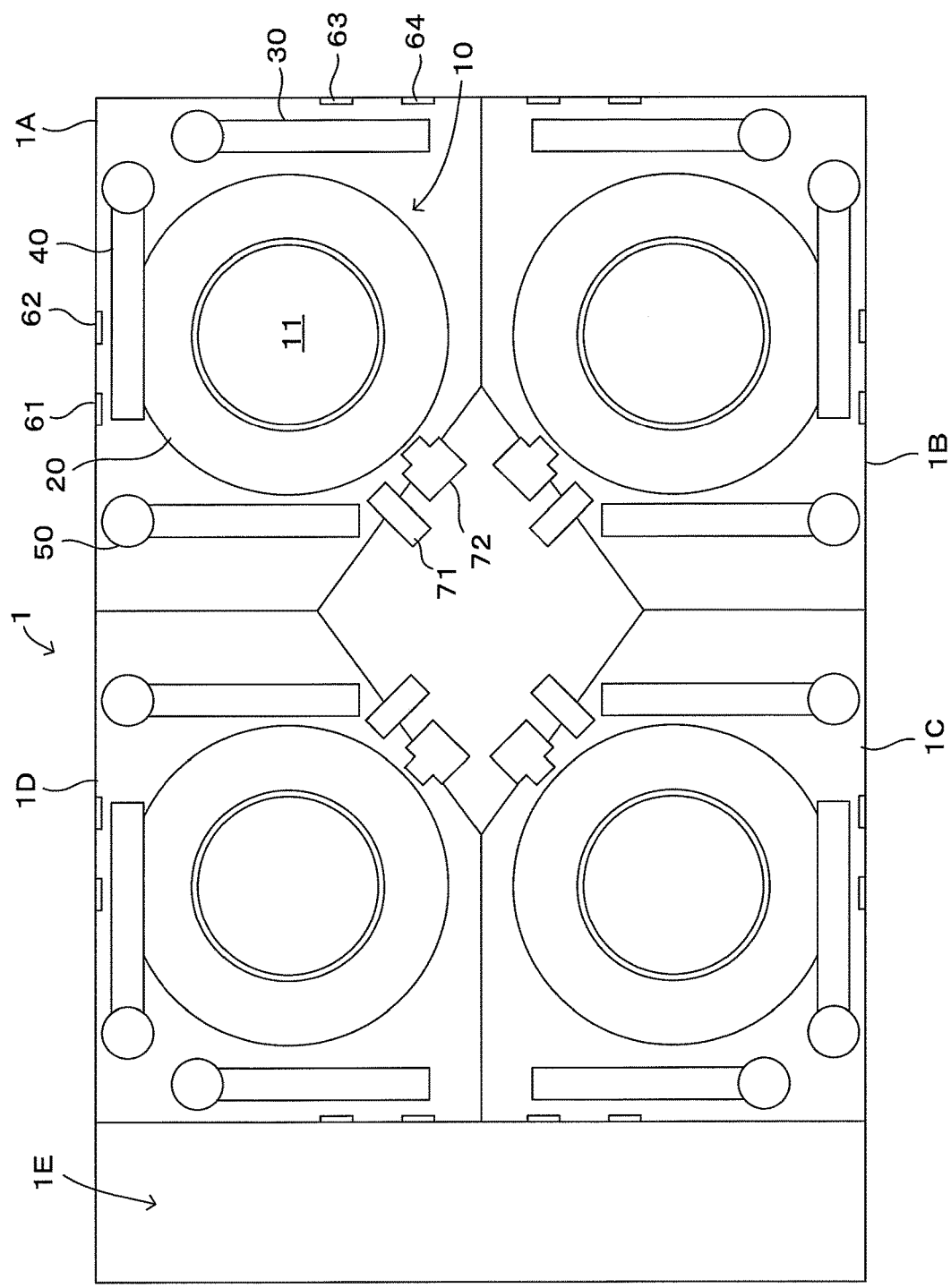
FIG. 1 is a schematic drawing showing the structure of a substrate processing system according to an embodiment of the invention.

FIG. 1 is a schematic drawing showing the structure of a substrate processing system according to an embodiment of the invention. To be more specific, FIG. 1 is a plan view which shows an embodiment of a substrate processing system comprising a substrate processing apparatus to which the invention is applied in a preferable fashion. The substrate processing system 1 comprises substrate processing units 1A, 1B, 1C and 1D, an indexer part 1E and a controller 80 (FIG. 3). The substrate processing units 1A, 1B, 1C and 1D are capable of executing predetermined processing of a substrate independently of each other. The indexer part 1E is equipped with an indexer robot (not shown) which is for transferring the substrate to the substrate processing units 1A, 1B, 1C and 1D from outside and vice versa. The controller 80 controls operations of the entire system. Any number of substrate processing units may be disposed, and more than one layers each housing four substrate processing units which are arranged horizontally may be stacked one atop the other.

The substrate processing units 1A, 1B, 1C and 1D are identical to each other with respect to structural elements and operations, although the layout of the structural elements is partially different depending upon the locations of these units within the substrate processing system 1. The following will describe the structure and operations of the substrate processing unit 1A but will omit describing the other semiconductor processing units 1B, 1C and 1D in detail. As described below, each of the substrate processing units 1A through 1D has a function of a "substrate processing apparatus" which performs a predetermined process to the substrate and a function of a "displacement detecting apparatus" of the invention using a processing nozzle as a "positioning object".

Figure 2:
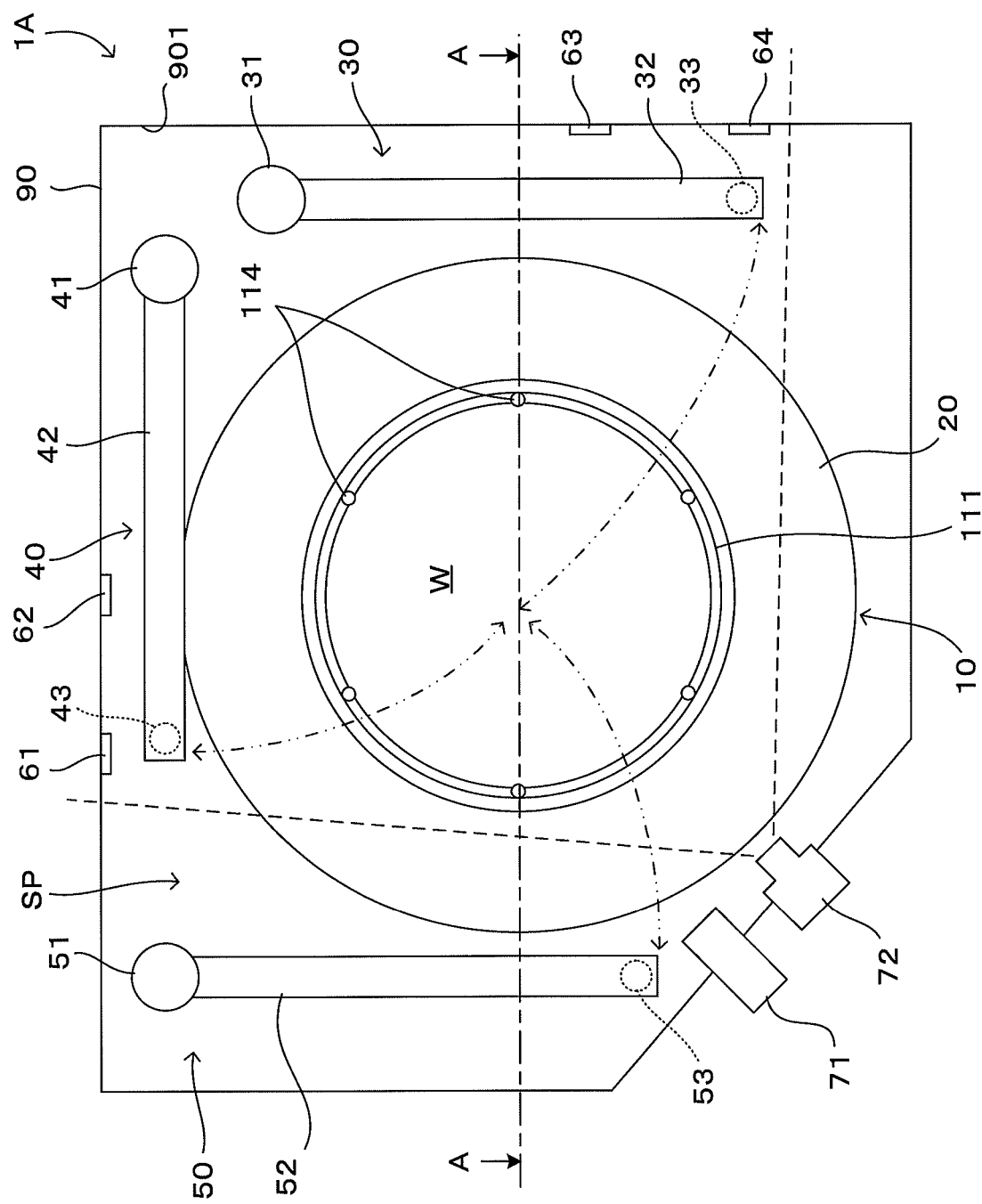
FIG. 2 is a plan view showing the structure of one substrate processing unit.

FIG. 2 is a plan view showing the structure of one substrate processing unit. FIG. 3 is a drawing showing the cross section of FIG. 2 taken along the arrow A-A and shows the structure of the controller of the substrate processing unit. The substrate processing unit 1A is a wet processing unit of the single wafer processing type for executing wet processing, such as cleaning and etching using a processing fluid, of a disk-shaped substrate W such as a semiconductor wafer. In the substrate processing unit 1A, a fan filter unit (FFU) 91 is disposed to a ceiling section of a chamber 90. The fan filter unit 91 comprises a fan 911 and a filter 912. External atmosphere which is admitted as the fan 911 operates is supplied into a processing space SP which is inside the chamber 90 via the filter 912. The substrate processing system 1 is used as it is installed inside a clean room, and the processing space SP continuously receives clean air all times.

A substrate holder 10 is disposed inside the processing space SP of the chamber 90. The substrate holder 10 is for rotating the substrate W while maintaining the substrate W in an approximate horizontal posture so that the one surface of the substrate W is directed toward above. The substrate holder 10 comprises a spin chuck 11 in which a disk-shaped spin base 111 whose outer diameter is slightly larger than the substrate W and a rotation support shaft 112 which elongates approximately along the vertical direction are integrated and linked with each other. The rotation support shaft 112 is linked with the rotation shaft of a chuck rotating mechanism 113 which includes a motor so that it is possible for the spin chuck 11 to rotate about the rotation shaft (the vertical axis) when driven by a chuck driver 85 of the controller 80. The rotation support shaft 112 and the chuck rotating mechanism 113 are housed inside a cylindrical casing 12. The spin base 111 is integrated and linked with the top end of the rotation support shaft 112 by a fastening component such as a screw, and the spin base 111 is supported by the rotation support shaft 112 approximately horizontally. Hence, as the chuck rotating mechanism 113 operates, the spin base 111 rotates about the vertical axis. The controller 80 controls the chuck rotating mechanism 113 via a chuck driver 85, which makes it possible to adjust the rotation speed of the spin base 111.

There are a plurality of chuck pins 114 for grabbing the substrate W at the peripheral edge which are disposed in the vicinity of the peripheral edge of the spin base 111. There may be three or more (six in this example) such chuck pins 114 for the purpose of securely holding the circular substrate W. The chuck pins are disposed at equal angular intervals along the peripheral edge of the spin base 111. Each chuck pin 114 is structured so as to be able to switch between the pressing state in which it presses the exterior peripheral edge surface of the substrate W and the released state in which it is off the exterior peripheral edge surface of the substrate W.

Each one of the chuck pins 114 is released when the substrate W is handed over to the spin base 111 but remains in the pressing state when the substrate W is rotated and subjected to predetermined processing. When in the pressing state, the chuck pins 114 can hold the substrate W at the peripheral edge of the substrate and keep the substrate W approximately horizontally over a predetermined gap from the spin base 111. Thus, the substrate W is supported with its top surface directed toward above and its bottom surface directed toward below. The chuck pins 114 are not limited to above structure but may be of one of various known structures. The mechanism for holding substrates is not limited to chuck pins but may instead be a vacuum chuck which sucks the substrate W at the back surface of the substrate and thereby holds the substrate.

Around the casing 12, a splash guard 20 is disposed which surrounds the substrate W which is held horizontally by the spin chuck 11 in such a manner that the splash guard 20 can move upward and downward along a direction of the rotation shaft of the spin chuck 11. The splash guard 20 has an approximately rotation symmetric shape with respect to the rotation shaft, and comprises a plurality of guards 21 (two guards in this example), which are each disposed concentric to the spin chuck 11 and receive a splashed processing fluid from the substrate W, and a fluid receiver 22 which receives the processing fluid flowing down from the guards 21. As a guard up-down mechanism not shown disposed to the controller 80 makes the guards 21 ascend or descend stepwise, it is possible to segregate and collect a processing fluid such as a chemical solution and a rinse solution splashed around from the rotating substrate W.

Around the splash guard 20, at least one fluid supplier is disposed which provides the substrate W with various types of processing fluids such as a chemical solution which may be an etching solution, a rinse solution, a solvent, pure water and DIW (deionized water). In this example, as shown in FIG. 2, there are three fluid dischargers 30, 40 and 50. The fluid discharger 30 comprises a revolving shaft 31, which can revolve about the vertical axis when driven by an arm driver 83 of the controller 80, an arm 32 extending horizontally from the revolving shaft 31, and a nozzle 33 which is attached as it is directed toward below to the tip end of the arm 32. As the arm driver 83 drives the revolving shaft 31, the arm 32 swings about the vertical axis, whereby the nozzle 33 reciprocally moves between a retracted position which is outward beyond the splash guard 20 (i.e., the position denoted by the solid line in FIG. 3) and a position above the center of rotation of the substrate W (i.e., the position denoted by the dotted line in FIG. 3) as shown by the two-dot chain line in FIG. 2. The nozzle 33, while staying above the substrate W, discharges a predetermined processing fluid supplied from a processing fluid supplier 84 of the controller 80 and accordingly supplies the processing fluid to the substrate W.

Similarly, the processing fluid discharger 40 comprises a revolving shaft 41 which is driven by the arm driver 83, an arm 42 linked with this revolving shaft 41, and a nozzle 43 which is attached to the tip end of the arm 42 and discharges the processing fluid fed from the processing fluid supplier 84. The processing fluid discharger 50 comprises a revolving shaft 51 which is driven by the arm driver 83, an arm 52 linked with this revolving shaft 51, and a nozzle 53 which is attached to the tip end of the arm 52 and discharges the processing fluid fed from the processing fluid supplier 84. The number of the processing fluid dischargers is not limited to this but may be increased or decreased as needed.

In a condition that the substrate W is rotating at a predetermined rotation speed as the spin chuck 11 rotates, the processing fluid dischargers 30, 40 and 50 supply the processing fluid to the substrate W while the nozzles 33, 43 and 53 become positioned above the substrate W one after another, thereby performing wet processing of the substrate W. Different processing fluids or the same processing fluid may be discharged at the nozzles 33, 43 and 53 in accordance with the purpose of processing. Alternatively, two or more types of processing fluids may be discharged from one nozzle. The processing fluid supplied to the vicinity of the center of rotation of the substrate W spreads outwardly due to centrifugal force which develops as the substrate W rotates, and eventually gets drained off toward the side from the peripheral edge of the substrate W. The processing fluid thus splashed by the substrate W is then received by the guards 21 of the splash guard 20 and collected by the fluid receiver 22.

The substrate processing apparatus 1A further comprises an illuminator 71 which illuminates inside the processing space SP and a camera 72 which is neighboring of the illuminator 71 and takes an image of the surface of inside the chamber 90. The illuminator 71 uses an LED lamp as a light source for instance, and provides illumination light into inside the interior of the processing space SP which is needed for taking an image with the camera 72. The camera 72 is disposed at a higher position as compared with the substrate W along the vertical direction, and its imaging direction (i.e., the direction of the optical axis of the imaging optical system) is set as a downwardly oblique direction toward the approximate center of rotation in the surface of the substrate W so as to take an image of the top surface of the substrate W. The entire surface of the substrate W held by the spin chuck 11 thus comes into inside the field of view of the camera 72. In horizontally, an area between the two dashed lines in FIG. 2 is included in the field of view of the camera 72.

The illuminator 71 and the camera 72 may be disposed inside the chamber 90, or they may be disposed outside the chamber 90 so as to illuminate or take an image of the substrate W via a transparent window of the chamber 90.

Image data output from the camera 72 are fed to an image processor 86 of the controller 80. The image processor 86 then performs predetermined image processing of the image data such as a correction processing or a pattern matching processing described later. As described later in detail, in this embodiment, in accordance with images taken by the camera 72, how the nozzles 33, 43 and 53 are positioned and how the substrate W is held is determined. Further, the installment position of the camera 72 relative to the chamber 90 could get deviated from the appropriate position, which can be handled by the structure according to this embodiment.

For these purposes, alignment marks 61 through 64 which serve as position references are fixed at a plurality of positions which are within the field of view of the camera 72 and which are on an inner wall surface 901 of the chamber 90. The positions of the alignment marks 61 through 64 inside the chamber 90 have been determined in advance. The alignment marks 61 through 64 are so arranged that as illumination light irradiated from the illuminator 71 is reflected at the surfaces of the alignment marks 61 through 64, the reflected light impinges upon the camera 72. The alignment marks 61 through 64 contained within an image shot by the camera 72 are used as position references which are for assessment of the positions and the postures of the camera 72, the respective nozzles 33, 43 and 53 and the substrate W.

In addition to the above, the controller 80 of the substrate processing system 1 comprises a CPU 81, a memory 82 and a display 87. The CPU 81 executes a processing program set in advance and accordingly controls operations of the respective parts. The memory 82 stores the processing program executed by the CPU 81, data created during processing, etc. The display 87 informs a user as needed of a progress in processing, abnormality, etc. Each one of the substrate processing units 1A through 1D may have one such controller 80, or only one controller 80 may be disposed for the substrate processing system 1 for control of all substrate processing units 1A through 1D. Further, the CPU 81 may function as an image processor as well.

The operation of the substrate processing unit 1A having the structure above will now be described. The other substrate processing units 1B through 1D operate similarly although they will not be described. Through the indexer part 1E, the substrate processing unit 1A receives the substrate W which has been transported from outside and supplies various types of processing fluids while rotating the substrate W, thereby executing wet processing. A number of known techniques are available which use various types of processing fluids for wet processing, and any such technique may be used.

Figure 4:
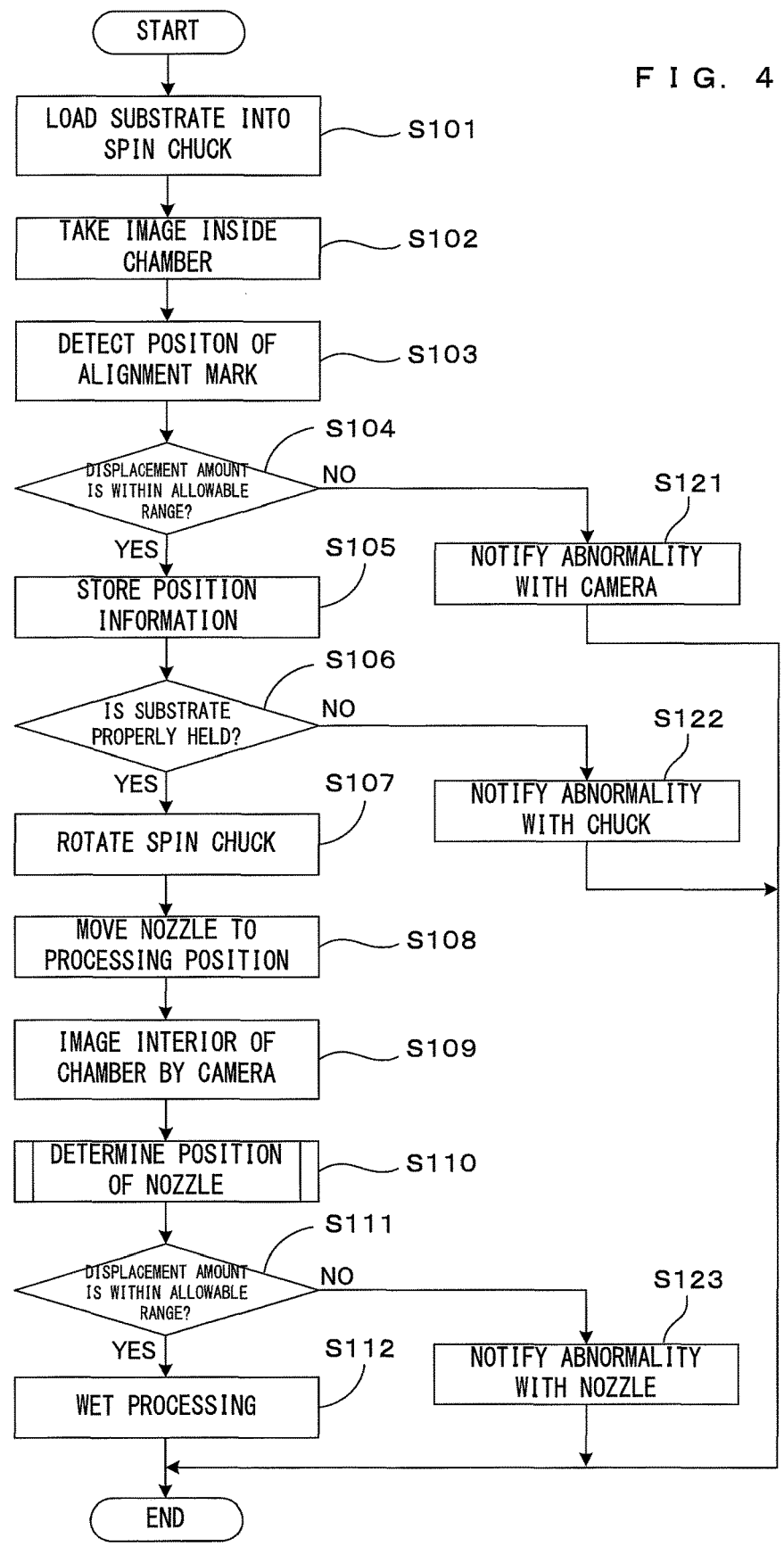
FIG. 4 is a flow chart showing the operation of the substrate processing unit.

FIG. 4 is a flow chart showing the operation of the substrate processing unit. This operation is realized as the CPU 81 executes the predetermined processing program. The substrate W is loaded into the substrate processing unit 1A and is then set to the spin chuck 11, more specifically, to the plurality of chuck pins 114 which are disposed to the peripheral edge of the spin base 111 (Step S101). During loading of the substrate W, the chuck pins 114 disposed to the spin base 111 are in the released state but switch to the pressing state after the substrate W is set at the chuck pins 114 and accordingly hold the substrate W. In this state, the camera 72 takes an image of inside of the chamber 90 (Step S102).

Figure 5:
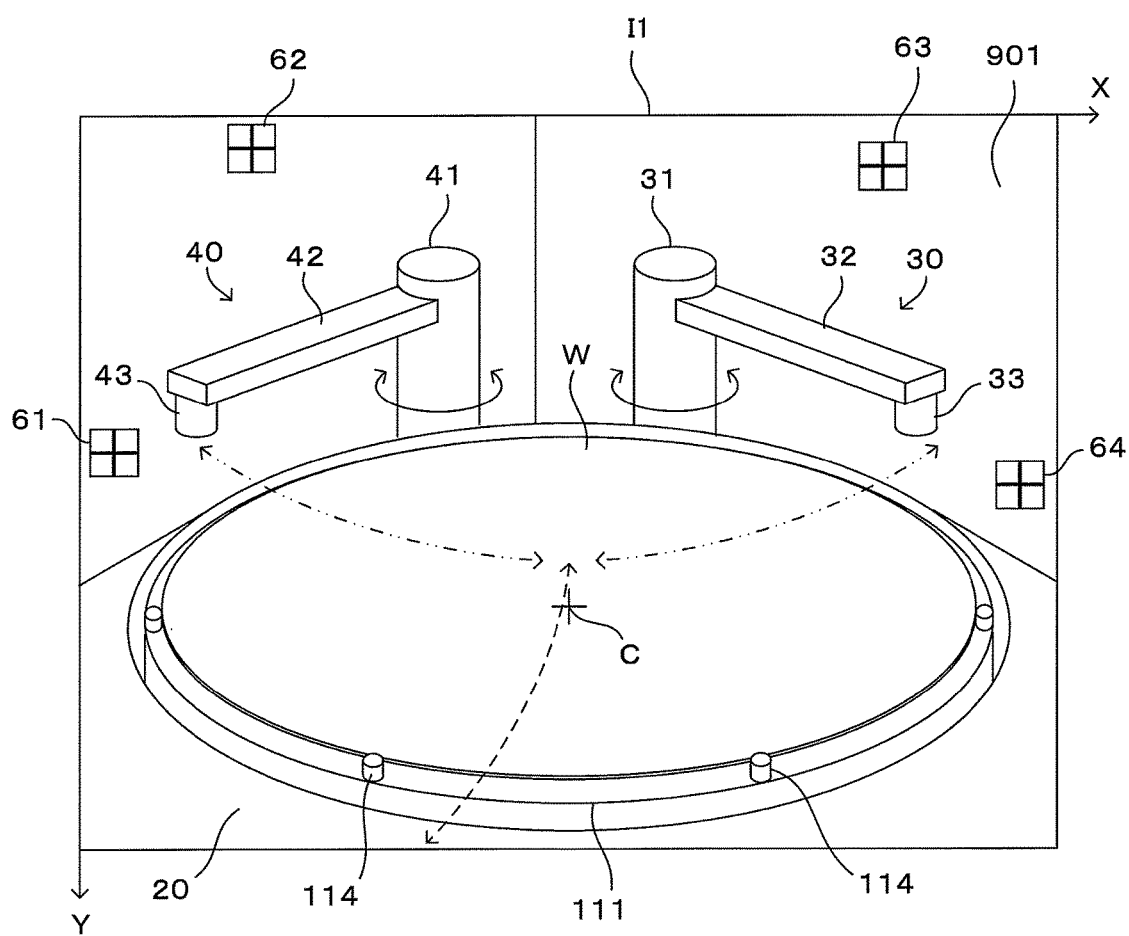
FIG. 5 is a schematic drawing showing an example of an image which is obtained by imaging inside the chamber.

FIG. 5 is a schematic drawing showing an example of an image which is obtained by imaging inside the chamber. An image I1 shot by the camera 72 which is installed at such a position which looks down on the substrate W contains the substrate W which is mounted on the spin base 111 and the respective members such as the splash guard 20 which surrounds the substrate W, fluid dischargers 30 and 40 and the alignment marks 61 through 64. The assumption is that the camera 72 is attached at an appropriate position relative to the chamber 90.

In image examples in FIG. 5 and later figures, the upper and left corners of the images are regarded as origins and the horizontal direction and the vertical direction of the images are defined as X-direction and Y-direction respectively. Each position in one image may be specified by coordinate of the X-Y image plain which is represented by the X-coordinate extending rightward from the origin and the Y-coordinate extending downward from the origin.

The alignment marks 61 through 64 are arranged at dispersed positions on the chamber inner wall 901 which are within the field of view of the camera 72 and which are not blocked by the substrate W or the respective members disposed inside the chamber 90 such as the fluid dischargers 30 and 40. Specifically, the alignment marks 61 and 64 are so arranged that they are captured by the camera at such positions which are around the center of the image I1 along the perpendicular direction and which are close to the far-left and the far-right along the horizontal direction. Meanwhile, the alignment marks 62 and 63 are arranged such that they are apart from each other horizontally close to the top edge of the image I1. As the alignment marks 61 through 64 are dispersed in this manner, it is possible to enhance the accuracy during detection of deviation of the camera 72 which will be described later.

Although the alignment marks 61 through 64 may be of any desired material and may have any desired shapes, it is desirable that the camera 72 can shoot them under illumination light from the illuminator 71 in sufficient contrast for position detection. More preferably, it is desirable that the shapes of the alignment marks can be detected at a high accuracy from an image which was shot. The alignment marks 61 through 64 in this substrate processing unit 1A are rectangle plate members which bear the mark which looks like "+" as shown in FIG. 5. For instance, plate members of stainless steel on which the mark above is engraved or painted may be used. Provision of the alignment marks which have these characteristics makes it possible to highly accurately detect not only the positions of the alignment marks but rotation, the sizes and the like within the image as well.

In the event that the direction in which the illumination light impinges and the direction of the optical axis of the camera 72 generally match with each other as in the case of the unit 1A in which the camera 72 and the illuminator 71 are disposed in the vicinity of each other, it is preferable that at least one of the plate members and the marks is formed by a retroreflective material. This secures that the reflected light from the alignment marks impinges upon the camera 72 without fail, thereby making it possible to shoot high-contrast images of the alignment marks using large light quantity. In consequence, the accuracy for detecting the positions of the alignment marks is further increased.

As indicated by the double chain line in FIG. 5, the nozzles 33 and 43 which discharge the processing fluid are capable of moving horizontally. As the processing fluid is discharged in a condition that these nozzles are located at predetermined positions above the substrate W, the substrate W is processed. The nozzle 53 (FIG. 2) not shown in FIG. 5 as well, as a trajectory thereof is shown in broken line in FIG. 5, when moving toward above the substrate W, comes into the field of view of the camera 72. Using an image shot with the camera 72, it is possible to determine whether the positions of the nozzles during execution of the processing are appropriate. In this manner, it is possible to avoid inappropriate processing by any nozzle which is at an inappropriate position and to stably process the substrate W.

However, it is possible that the camera 72 per se could be deviated relative to the chamber 90 because of contact with any member during loading or unloading of the substrate W, vibration during the processing or the like for instance. It is therefore necessary to prevent misdetection of the position of any nozzle due to such deviation. In this embodiment, the alignment marks 61 through 64 are fixed to the inner wall surface 901 of the chamber 90 and the position of each alignment mark 61 through 64 inside the chamber 90 remains unchanged. Thus, the position of each alignment mark 61 through 64 is precisely known in advance for an image imaged by the camera 72 mounted at a proper position with respect to the chamber 90.

From this, the presence or absence of a positional displacement of the camera 72 can be determined based on whether or not the alignment marks 61 through 64 are at predetermined positions in the imaged image. A plurality of the alignment marks 61 through 64 are arranged to appear at dispersed positions in the image. Thus, the presence or absence, the size, the direction and the like of the positional displacement of the camera 72 can be detected from these position detection results in the image.

Referring back to FIG. 4, the flow chart is further described. Using the image inside the chamber 90 imaged in Step S102, the positions of the alignment marks 61 through 64 in the image are detected based on the above principle (Step S103). A positional displacement amount of the camera 72 is evaluated based on that detection result. If the positional displacement amount is within an allowable range determined in advance (YES in Step S104), processings in and after Step S105 are performed. On the other hand, if the positional displacement amount is beyond the allowable range (NO in Step S104), the occurrence of a camera abnormality is notified to the user, for example, by displaying a predetermined error message on the display 87 (Step S121) and the process is finished.

If the camera 72 is largely shifted for a certain cause, any one of the alignment marks may be deviated from an imaging visual field. In such a case, the position of this alignment mark cannot be detected. It is clear that this state causes a problem in the subsequent detection and, hence, this case may be also regarded as a camera abnormality.

In this substrate processing unit 1A, a positional displacement of the camera 72 is detected as described above. If there is a small positional displacement as a result of the detection, the process is continued on the assumption that the positional displacement is corrected by an image processing. On the other hand, if there is a large positional displacement unavoidably resulting in a reduction of detection accuracy even if a correction is made, the process is stopped. In this way, a certain positional displacement of the camera 72 is allowed and the process is continued. It possibly causes reductions in the throughput of the process and an operating rate of the system that the entire process is stopped due to the positional displacement of the camera 72 not directly contributing to the substrate processing. In the above way, a probability of causing such a situation can be reduced. On the other hand, by stopping the process, when there is a large positional displacement, it is prevented that an improper process is performed on the substrate.

If the obtained positional displacement amount of the camera 72 is within the allowable range, information indicating the positional displacement amount at that time is stored in the memory 82 (Step S105). This information is used as correction information in detecting the position of the nozzle later. Note that the information stored in the memory 82 may be position information of each alignment mark 61 through 64 or may be information on the positional displacement amount of the camera 72 calculated from those pieces of information. Any piece of information reflects the position information of each alignment mark detected from the image and indicates the positional displacement amount of the camera 72.

Subsequently, whether or not the substrate W is properly held by the spin chuck 11 is determined (Step S106). If the substrate W is placed while being inclined with respect to the spin base 111 or deviated from the rotation center, a problem that the substrate W falls or abnormally vibrates during the rotation of the spin chuck 11 possibly occurs. To avoid these, the holding state of the substrate W is determined before the spin chuck 11 is rotated. The holding state can be determined, for example, based on the posture of the substrate W detected from the image.

A known pattern matching technique can be used for the detection of the substrate W in the image. Besides, a known ellipse detection algorithm can be used as a method capable of detection in a shorter time. Specifically, ellipses of a size corresponding to a diameter of the substrate W are searched by an appropriate ellipse detection algorithm, using a coordinate range in an area having a high probability of being taken up by the substrate W in the image as a search area. As a result, center coordinates and sizes in X and Y directions of the ellipse matching the condition are obtained.

If these numerical values substantially match numerical values in an ideal holding state, it can be determined that the substrate W is properly held. On the other hand, if the numerical values largely deviate, it can be determined that the substrate W is improperly held.

Note that the posture of the substrate W detected from the image is the addition of the posture of the substrate W in the processing space SP and the influence of the positional displacement of the camera 72 described above. Thus, the posture of the substrate W obtained by the search is compared with the ideal state after the influence by the positional displacement of the camera 72 is subtracted based on the position information of the alignment marks obtained earlier, and the holding state is determined from that result.

Referring back to FIG. 4 again, the flow chart is further described. If it is determined that the substrate W is improperly held by the spin chuck 11 (NO in Step S106), the occurrence of a chuck abnormality is notified to the user, for example, by displaying a predetermined error message on the display 87 (Step S122) and the process is finished. In this way, the fall and abnormal vibration of the substrate W due to the rotation of the spin chuck 11 in the improper holding state can be avoided.

If the holding state is proper (YES in Step S106), the spin chuck 11 is rotated at a predetermined rotation speed for the substrate processing (Step S107). Subsequently, the arm driver 83 is activated to position any one of the plurality of nozzles at a predetermined processing position facing the substrate W (Step S108). Although the process using the nozzle 43 is described below, a similar operation is performed also in the case of using the other nozzles 33, 53. Further, the plurality of nozzles may be simultaneously used for the process. When the nozzle 43 is positioned at the processing position, the camera 72 images the interior of the chamber 90 (Step S109) and the position of the nozzle 43 is determined based on that image (Steps S110, S111).

Figure 6:
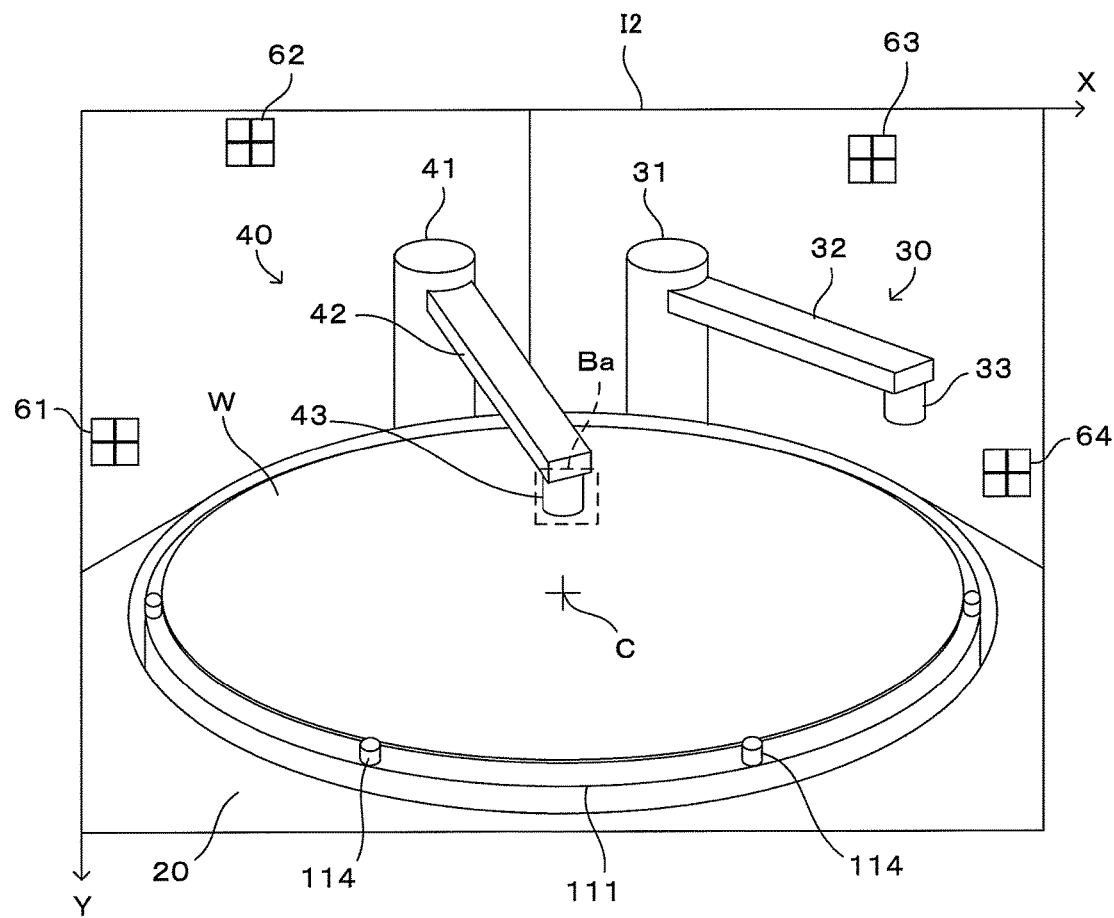
FIG. 6 is a drawing showing an example of an image obtained by imaging the nozzle.

FIG. 6 is a drawing showing an example of an image obtained by imaging the nozzle. More specifically, an example of an image I2 obtained by imaging the interior of the chamber 90 with the nozzle 43 positioned at the processing position above the substrate W is shown in FIG. 6. The controller 80 can learn the processing position of the nozzle 43 by a prior teaching operation. Here, it is assumed that a position above the rotation center C of the substrate W is set as the processing position of the nozzle 43.

A reference matching pattern and box information are obtained from an image imaged in advance in a state where there is no positional displacement of the camera 72 or the positional displacement is properly corrected and the nozzle 43 is correctly positioned at the processing position by the prior teaching operation. Specifically, an image pattern of an area Ba taken up by the nozzle 43 in the image is obtained as the reference matching pattern and coordinate information of the area Ba is obtained as the box information used for the detection of the nozzle position when the process is performed on the substrate. These pieces of information are stored in the memory 82 in advance. Every time the process is performed on the substrate, the position of the nozzle 43 is detected from the image I2 imaged in Step S109 and the positional displacement amount of the nozzle 43 is calculated by comparing the detected position with the box information (Step S110). Based on that result, whether or not the position of the nozzle 43 is proper is determined (Step S111).

Figure 7:
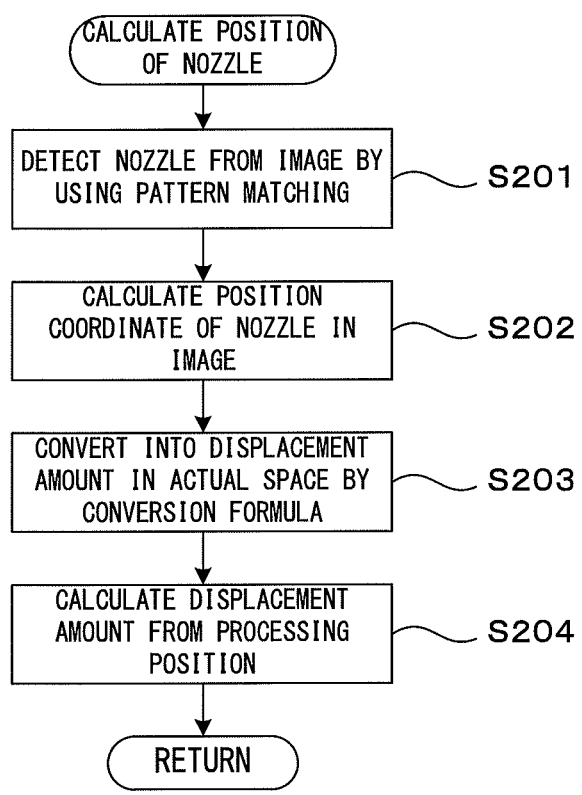
FIG. 7 is a flow chart showing a nozzle position calculation process.

FIG. 7 is a flow chart showing a nozzle position calculation process. This flow chart more specifically explains the processing contents of Step S110 of FIG. 4. In this process, the nozzle 43 is first detected from the image I2 using the pattern matching technique (Step S201). The following two methods are, for example, considered as a method for detecting the nozzle 43 from the image I2 by the pattern matching technique. The first method is a method for searching the area Ba having image contents matching the reference matching pattern stored in the memory 82 in the image I2. Further, the second method is a method for comparing image contents of the area Ba specified by the box information stored in the memory 82 out of the image I2 with those of the reference matching pattern and evaluating a matching score between the both. Either one of the methods may be used and a method other than those may also be used.

When the area Ba corresponding to the nozzle 43 is detected in the image I2, the position coordinates thereof are obtained and stored in the memory 82 (Step S202). Typical coordinates indicating the position of the area Ba such as the coordinates of a left-upper corner of the area Ba or those of a centroid of the area Ba can be used as the position coordinates of the nozzle 43. Note that if there is a positional displacement of the camera 72, the coordinates are appropriately corrected to compensate for this positional displacement in processings of Steps S201 and S202.

Subsequently, the position of the nozzle 43 obtained in the image I2 is converted into a displacement amount of the nozzle 43 from the reference position in the actual space inside the chamber 90 by a conversion formula prepared in advance by a method to be described later (Step S203). The reference position is specified inside the chamber 90 in advance. For example, the processing position can be used as the reference position. However, if a positional relationship with the processing position as a positioning target position of the nozzle 43 is clear, the reference position may be different from the processing position. On the other hand, since necessary information is the positional displacement amount of the nozzle 43 from the designated processing position, the positional displacement amount from the processing position of the nozzle 43 is calculated based on the positional relationship of those known in advance if the reference position and the processing position are different (Step S204).

As shown in FIG. 2 and FIG. 5, the arm 42 rotates about the rotary shaft 41, whereby the nozzle 43 moves along an arc including the processing position above the rotation center of the substrate W in the horizontal direction. On the other hand, the image I2 is imaged by the camera 72 arranged to look down upon a movement path of the nozzle 43 obliquely from an upper side. Thus, a trajectory of the nozzle 43 in the images I2 when the nozzle 43 moves along that movement path is complicated. Further, particularly near an end part of the image, the image may be distorted due to lens characteristics of the camera 72. By these causes, a moving direction and a movement amount of the image of the nozzle 43 generally have a nonlinear relationship between the movement in the actual space and the movement in the images I2.

For the purpose of determining whether or not the nozzle 43 is positioned at the proper position, it is necessary to grasp the position of the nozzle 43 or the positional displacement amount of the nozzle 43 from the reference position not in the image I2, but in the actual space. Since the nozzle position in the image I2 and that in the actual space have a nonlinear relationship as described above, conversion from the position of the nozzle 43 in the image I2 into the position of the nozzle 43 in the actual space needs to be properly performed. How to obtain the conversion formula for this purpose is described below. Note that, for the purpose of determining whether or not the nozzle is properly positioned, the coordinate position of the nozzle 43 in the actual space needs not necessarily be specified and it is sufficient to accurately obtain the positional displacement amount from the reference position.

Figure 8A:
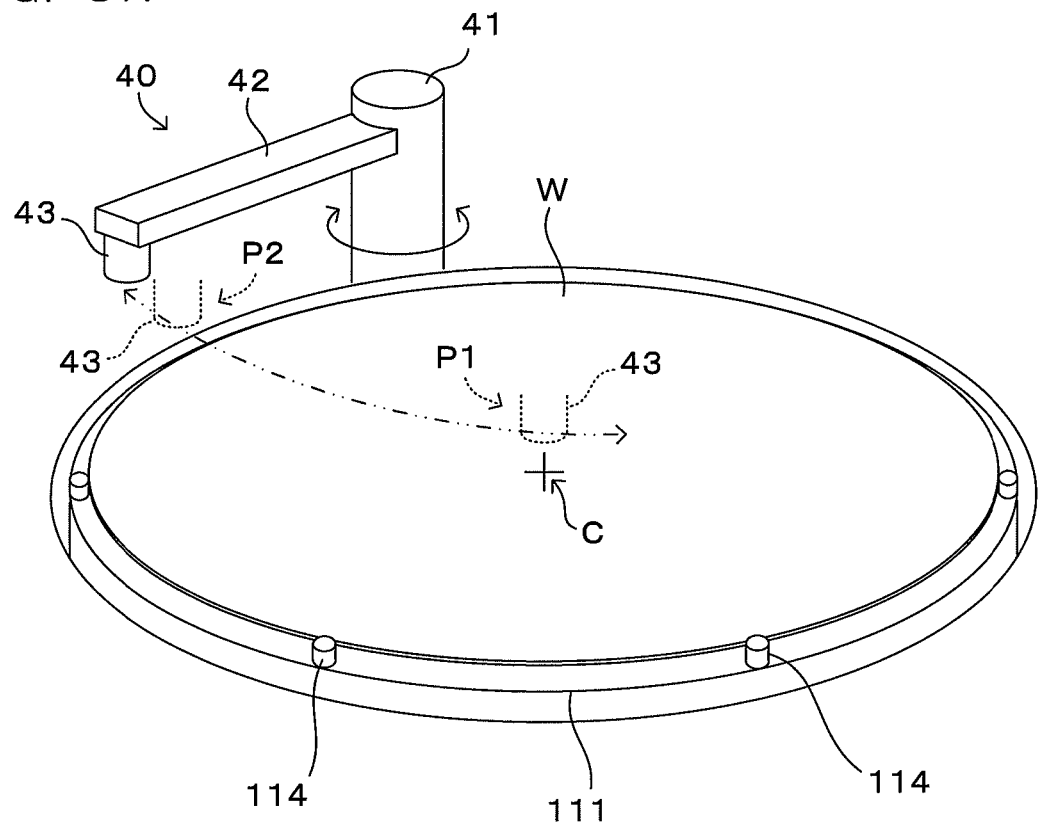
FIGS. 8A and 8B are drawings showing the reference position of the nozzle.
Figure 8B:
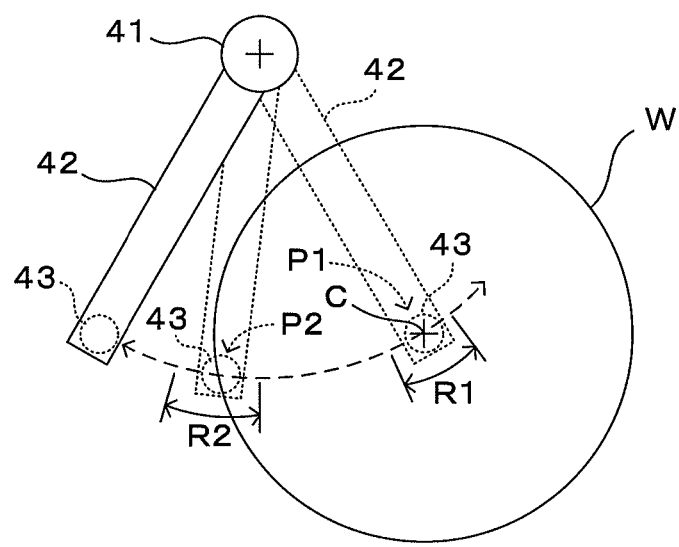

FIGS. 8A and 8B are drawings showing the reference position of the nozzle. More specifically, FIG. 8A is a bird's eye view showing a relationship between the movement path of the nozzle and the reference positions and FIG. 8B is a top view showing that relationship. As described above, the nozzle 43 horizontally moves along an arcuate trajectory. At least one reference position is set on that movement path. Here, it is assumed that a position P1 where the nozzle 43 is located right above the rotation center C of the substrate W and a position P2 where the nozzle 43 is located right above a peripheral edge part of the substrate W are used as reference positions as shown in FIGS. 8A and 8B.

Note that the number and arrangement of the set reference positions are arbitrary. As described later, in this embodiment, the conversion formula is so determined that a relationship between the nozzle position in the image I2 and the nozzle position in the actual space is expressed with a certain accuracy near the set reference positions. Since the relationship of the nozzle position in the image I2 and the actual space is generally complicated as described above, a conversion formula accurately expressing the relationship of the both in the entire movement path is very complicated and unrealistic. On the other hand, the conversion formula is drastically simplified if a condition of guaranteeing accuracy only in ranges near the reference positions is given.

The conversion formula assuming such a condition naturally has lower accuracy with distance from the reference position. From this, it is desirable to set the reference position at or near the position of the nozzle (e.g. processing position) used in the actual process. If many reference positions are arranged in the movement path, it is possible to ensure the accuracy of position detection in a wider range. The number and arrangement of the set reference positions can be determined from these perspectives.

A predetermined range including the reference position P1 out of a movable range of the nozzle 43 along an arc is virtually defined as a neighborhood range R1 of the reference position P1. Further, a predetermined range including the reference position P2 out of the movable range is virtually defined as a neighborhood range R2 of the reference position P2. Although the neighborhood ranges R1, R2 are so set that the reference positions P1, P2 are centers thereof here, the reference positions may not be the centers of the neighborhood ranges. Further, the reference positions may, be located at positions slightly deviated from the neighborhood ranges.

The spreads of the neighborhood ranges R1, R2 can be appropriately set according to ranges necessitating good position detection accuracy. For example, if the reference position is the processing position, the neighborhood range is preferably set to include at least the entire allowable range of the positional displacement of the nozzle 43 positioned at this processing position with the processing position as a center. Unless the reference position is the processing position, the neighborhood range can be arbitrarily set. Further, the size of the neighborhood range can be quantitatively expressed, for example, by any one of a length of the arc representing the movement path of the nozzle 43, a magnitude of an arc angle of the arc and a linear distance between opposite ends of the neighborhood range. In this embodiment in which the movement of the nozzle 43 is constrained to the one on the arc, methods for expressing the size of the neighborhood range are technically equivalent. The conversion formula from the position in the image I2 into the displacement amount in the actual space is so determined that the position of the nozzle 43 is accurately expressed in the neighborhood ranges R1, R2 set in this way.

Figure 9A:
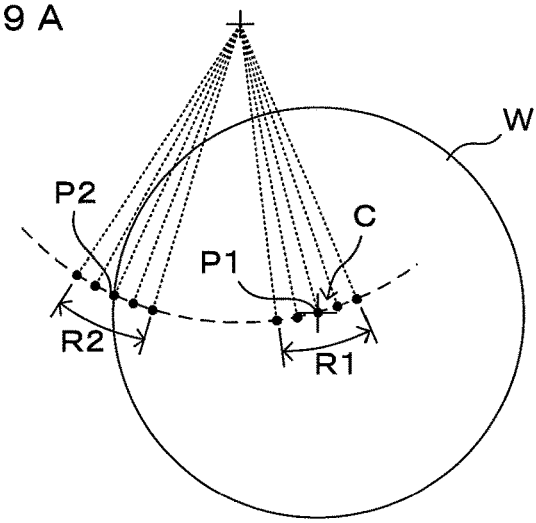
FIGS. 9A and 9B are drawings showing the principle of conversion formula calculation.
Figure 9B:
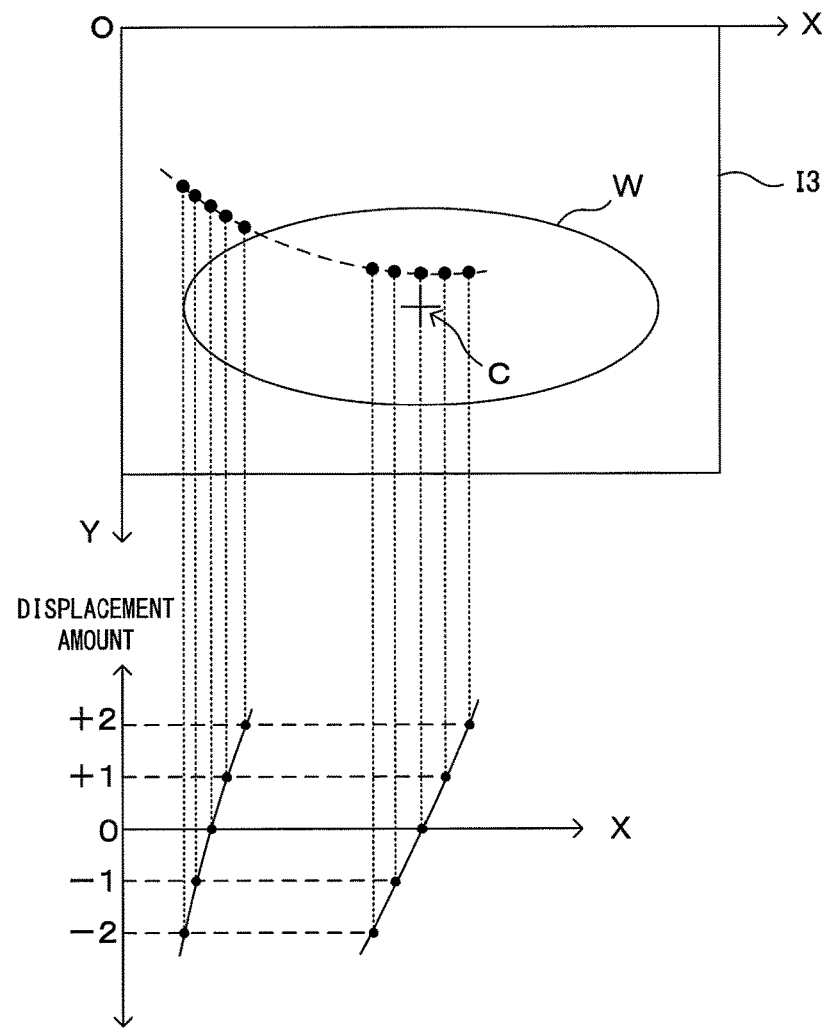

FIGS. 9A and 9B are drawings showing the principle of conversion formula calculation. As shown by black dots in FIG. 9A, a plurality of imaging positions are provided in each of the neighborhood ranges R1, R2 on the movement path of the nozzle 43. In this embodiment, imaging is performed every time while the position of the nozzle 43 is changed in a multi-step manner. Then, a correlation between the position of the nozzle 43 detected in the obtained image and the position of the nozzle 43 in the actual space when this image was imaged is obtained. The set position of the nozzle 43 in the actual space when this imaging is performed is the imaging position mentioned here.

In this example, the reference position P1 is one of the imaging positions and two imaging positions are set at each of opposite sides of the reference position P1 to be appropriately distributed in the neighborhood range R1. For example, the plurality of imaging positions can be set at equal angular intervals with respect to the rotation center of the arm 42, i.e. at equal intervals along the movement path of the nozzle 43. The number of the set imaging positions is arbitrary and the imaging positions need not always include the reference position. By increasing the number of samples by increasing the imaging positions, the accuracy of the conversion formula can be enhanced. For example, a positional displacement allowance of the nozzle is about (±2 mm) with respect to the determined processing position, an interval between the imaging positions can be set at about 0.5 mm.

When imaging is performed while the nozzle 43 is positioned at the plurality of imaging positions different from each other in this way, the position of the nozzle 43 successively changes along the movement path thereof in an obtained image I3 as shown by black dots in an upper part of FIG. 9B. If an X-coordinate of the nozzle position in the image I3 and a displacement amount of the nozzle 43 in the actual space are plotted, a nonlinear relationship generally appears between the both as shown in a lower part of FIG. 9B. Specifically, each point on a graph is connected by an appropriate curve. Note that the displacement amount taken on a vertical axis is expressed with each of the reference positions P1, P2 set as a starting point of displacement, the equally set interval between the imaging positions on an arc as a path of the nozzle 43 in the actual space set as 1 unit and a direction extending from a retracted position lateral to the substrate W toward the substrate center C (rightward direction in FIG. 9A) set as a "+ direction".

Since the movement path of the nozzle 43 in the actual space is constrained to the one on the arc, the position of the nozzle 43 in the image I3 can be uniquely specified only by either one of the X-coordinate and the Y-coordinate. Although the position in the image I3 is expressed by an X-coordinate value here, it may be expressed by a Y-coordinate value. For example, as the trajectory is shown in broken line in FIG. 5, the nozzle 53 mainly largely moves in the Y direction in the image, whereas a movement in the X direction is small. In such a case, it is appropriate to express the position of the nozzle by a Y-coordinate value. Note that, depending on the movement of the nozzle in the image, it may not be possible to uniquely express the position of the nozzle by one coordinate in this way. In such a case, the position of the nozzle 43 needs to be naturally expressed by a combination of an X-coordinate value and a Y-coordinate value.

Such a curve representing a correlative relationship between the displacement amount of the nozzle 43 in the actual space and the X-coordinate in the image is expressed by an approximation formula. By doing so, the magnitudes of the displacements of the nozzle 43 from the reference positions P1, P2 in the actual space can be obtained by substituting an X-coordinate value of the nozzle position detected in an image obtained by imaging the nozzle 43 into that approximation formula. Thus, this approximation formula becomes a conversion formula for obtaining the nozzle displacement amount in the actual space from the nozzle position in the image. In the case of expressing the nozzle position in the image by a combination of an X-coordinate value and a Y-coordinate value, the approximation formula also uses the X-coordinate value and the Y-coordinate value as parameters, but a basic concept is the same.

Specific contents of a conversion formula calculation process based on the above principle are described below. This process is realized by the CPU 81 executing a processing program determined in advance and performed for one reference position of one nozzle. In other words, if a plurality of reference positions are set for one nozzle, the conversion formula calculation process is performed for each reference position. Further, if there are a plurality of nozzles for which the reference positions are set, a similar process is performed for each nozzle.

Figure 10:
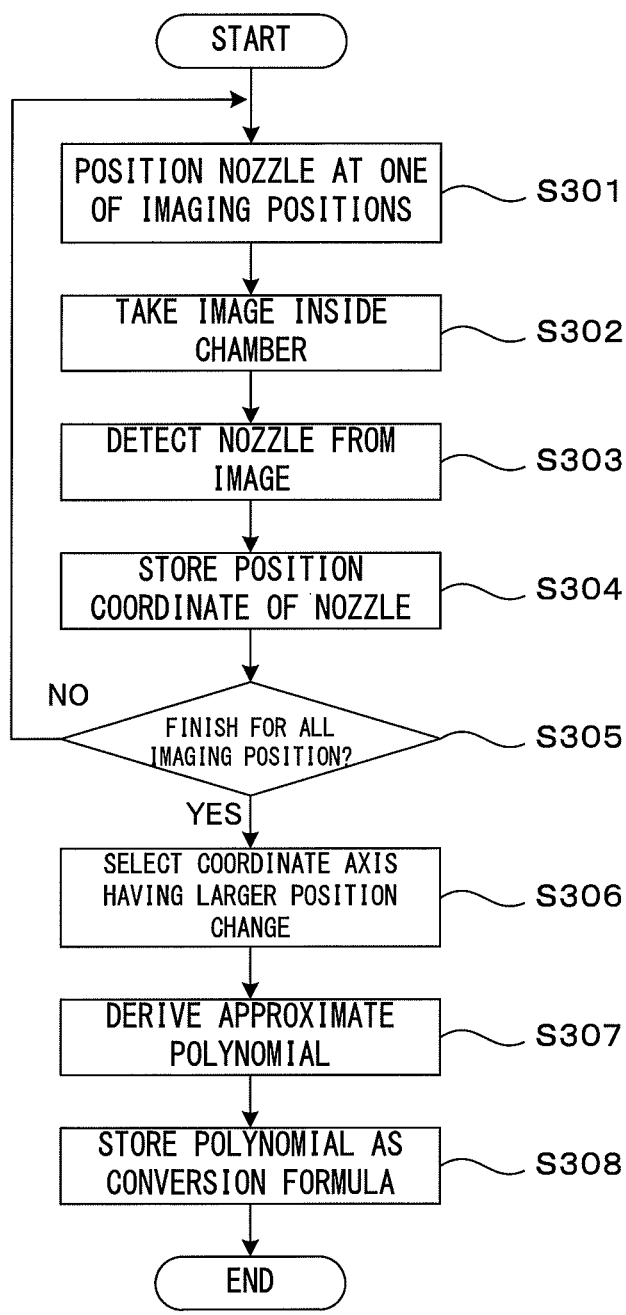
FIG. 10 is a flow chart showing the conversion formula calculation process.

FIG. 10 is a flow chart showing the conversion formula calculation process. First, the arm driver 83 rotates the arm 42 by a predetermined amount, whereby the nozzle 43 is positioned at one of the imaging positions (Step S301). In this state, the interior of the chamber 90 is imaged by the camera 72 (Step S302), the nozzle 43 is detected from an image by the image processor 86 (Step S303) and the position coordinates of the nozzle 43 are stored in the memory 82 (Step S304). Until the above process is finished for all the imaging positions (Step S305), imaging and nozzle position detection are performed while the imaging positions are successively switched.

As the imaging position changes, the position coordinates (X- and Y-coordinate values) of the nozzle 43 in the image successively change. Out of these, a coordinate axis having a larger change amount (difference between a maximum coordinate value and a minimum coordinate value) as a whole is selected (Step S306). By doing so, good accuracy can be ensured for the conversion formula by extending a dynamic range of position data.

A formula approximately expressing a correlation between the coordinate value of the nozzle position in the image and the displacement amount of the nozzle in the actual space on the selected coordinate axis is obtained as an appropriate polynomial (Step S307). The obtained polynomial is stored in the memory 82 as the conversion formula for this nozzle and this reference position (Step S308). If there are a plurality of reference positions or a plurality of nozzles, the above process is performed for each combination of these and those results are comprehensively stored as a correction table to be described later in the memory 82.

Since the relationship between the position coordinate of the nozzle in the image and the displacement amount of the nozzle in the actual space is generally nonlinear as described above, the conversion formula is preferably a polynomial having two or more degrees. As the number of degrees of the formula increases, the relationship of the both can be more accurately approximated. According to the knowledge of the inventors of this application, it is known to obtain practically sufficient accuracy by a polynomial having five to six degrees. An approximation polynomial can be obtained, for example, by using a known approximation calculation method such as a least squares method.

The conversion formula calculation process described above is performed if necessary before the process is performed on the substrate W besides being performed before the shipment of the apparatus. The calculation of the conversion formula is necessary, for example, when a component in the chamber 90 is exchanged, when a new component is mounted, when a new teaching operation is performed and when a regular maintenance operation is performed. Note that, if a processing recipe for the substrate is changed, the processing position, i.e. the position of the nozzle positioned during the processing for the substrate W is possibly changed according to this. At this time, if the newly set processing position is not in the range covered by the above conversion formula, a new conversion formula needs to be obtained for the vicinity of this processing position. If the conversion formulas are obtained for a plurality of reference positions in advance, a change of the processing recipe can be easily dealt with.

FIG. 11 is a drawing showing an example of the correction table. Here, a case where there are three nozzles specified by nozzle numbers 1, 2 and 3 and there are three reference positions specified by reference signs A, B and C for each nozzle is illustrated as an example here. However, these numbers are arbitrary. Further, the number of the reference positions may be different for each nozzle. Furthermore, besides data on the nozzles, data on other objects configured to be movable in the chamber 90 may also be included.

Conversion formulas F1a(X), F1b(X) and F1c(X) are respectively prepared for the positions A, B and C of the nozzle denoted by the nozzle number 1. These are expressed as functions of the X-coordinate value of the nozzle in the image. On the other hand, conversion formulas F2a(Y), F2b(Y) and F2c(Y) are respectively prepared for the positions A, B and C of the nozzle denoted by the nozzle number 2. These are expressed as functions of the Y-coordinate value of the nozzle in the image. Further, conversion formulas F3a(X, Y), F3b(X, Y) and F3c(X, Y) are respectively prepared for the positions A, B and C of the nozzle denoted by the nozzle number 3. These are expressed as functions having two variables, i.e. the X-coordinate value and the Y-coordinate value of the nozzle in the image. As just described, the conversion formulas obtained for each nozzle and each reference position are compiled into the correction table and stored in the memory 82.

In the nozzle position calculation process shown in FIG. 7, the conversion formula for conversion from the nozzle position detected in the image into the displacement amount in the actual space is used in Step S203. The conversion formula is effective only near the reference position and differs depending on a moving direction of the nozzle. Thus, a suitable conversion formula needs to be applied for each nozzle and each reference position. In Step S203, the correction table shown in FIG. 11 is referred to and the conversion formula corresponding to the currently focused nozzle and processing position is selected and used for the process. In this way, whether or not the nozzle position is proper can be precisely determined for each nozzle and each processing position.

Referring back to FIG. 4, the flow chart is further described. It is determined whether or not the positional displacement amount from the processing position of the nozzle 43 thus obtained is within the allowable range determined in advance (Step S111). If within the allowable range (YES in S111), the predetermined processing fluid is supplied to the substrate W from the nozzle 43 and the wet processing is performed (Step S112). If the positional displacement amount of the nozzle 43 is beyond the allowable range (NO in Step S111), the occurrence of a nozzle abnormality is notified to the user, for example, by displaying a predetermined error message on the display 87 (Step S123) and the process is finished. In this way, it can be avoided that the processing fluid is supplied from the nozzle 43 at an improper position, leading to a poor processing result. Further, since it is guaranteed that the process is performed by the nozzle 43 positioned at the proper position, a good processing result can be stably obtained.

As described above, in this embodiment, the position of the nozzle detected in the image imaged when the process is performed on the substrate is converted into the displacement amount of the nozzle in the actual space inside the chamber 90 and whether or not the nozzle position is proper is judged. The conversion formula obtained based on the correlative relationship between the nozzle positions detected in the images imaged by changing the nozzle position in a multi-step manner in advance and the positions of the nozzle in the actual space is applied for this conversion. In this way, whether or not the nozzle position is proper can be properly determined according to the nozzle position in the actual space.

The movement path of the nozzle in the images is not necessarily simple due to various causes such as the movement path of the nozzle in the actual space, the positional relationship with the camera and the distortions of the images caused by lens characteristics. However, highly accurate conversion can be performed even by a relatively simple mathematical formula if a partial range near the reference position determined in advance is focused out of the movable range of the nozzle. Accordingly, in this embodiment, imaging is performed while the position of the nozzle is changed in a multi-step manner near the reference position and the conversion formula is determined by obtaining the correlative relationship between the position coordinates of the nozzle in the images and the displacement amounts from the reference position of the nozzle in the actual space. By preparing a conversion formula individually optimized within the neighborhood range of each reference position for a plurality of reference positions, the detection accuracy of the displacement amount of the nozzle in the actual space can be enhanced.

As described above, in this embodiment, each substrate processing unit 1A to 1D constituting the substrate processing system 1 corresponds to a "displacement detecting apparatus" and a "substrate processing device" of the invention. The nozzle 33, 43, 53 is a "positioning object" and an "imaging object" of the invention and functions as a "processing nozzle" of the invention. Further, in the above embodiment, the arms 32, 42 and 52 and the arm driver 83 function as a "mover" of the invention and the camera 72 functions as an "imager" of the invention. Further, the CPU 81 and the image processor 86 function as a "displacement detector" of the invention and the memory 82 functions as an "information holder" of the invention. Further, in the above embodiment, the spin chuck 11 functions as a "holder" of the invention.

Further, in the above embodiment, the process shown in FIG. 4 includes a "displacement detecting method" of the invention and, out of the process, Step S109 corresponds to "imaging" in the invention and Step S110 and the nozzle position calculation process shown in FIG. 7 respectively correspond to "detecting" a displacement in the invention. Further, the conversion formula calculation process shown in FIG. 10 corresponds to "determining" conversion information in the invention. Further, in the above embodiment, each conversion formula stored in the correction table shown in FIG. 11 corresponds to "conversion information" of the invention.

Note that the invention is not limited to the embodiment described above and various changes other than those described above can be made without departing from the gist of the invention. For example, in the above embodiment, the "conversion information" of the invention is expressed as the conversion formula associating the nozzle position in the image and the displacement amount from the reference position of the nozzle in the actual space. However, the nozzle position in the image and the nozzle position in the actual space may be associated. In this case, the displacement amount of the nozzle can be calculated from the coordinates of the nozzle position and the reference position in the actual space obtained by conversion. Further, besides expression as mathematical formulas or functions, the conversion information can also be expressed, for example, as a look-up table associating the position coordinates in the image and the position of the actual space one to one. Further, the conversion information may be expressed, for example, by broken-line approximation.

Further, since the invention is applied to detect the positional displacement of the nozzle attached to the tip of the swing arm in the above embodiment, the movement path of the nozzle is limited to the one on a virtual arc in a horizontal plane. Thus, the position of the nozzle and the presence or absence of the displacement in the space inside the chamber can be uniquely expressed only by a scalar quantity which is the displacement amount from the reference position. However, more generally, the nozzle is movable to an arbitrary position in the actual space and a configuration for moving and positioning a positioning object by an XY moving mechanism is also, for example, conceivable.

Even in such a case, conversion from the position detection result in the image into the position or the displacement from the reference position in the actual space is possible by applying the technical concept of the invention. In this case, the displacement can be expressed as a vector having a direction and a magnitude. Note that there are possibly cases where positioning objects located at different positions in an actual space appear at the same position in a two-dimensional image and the position in the actual space cannot be uniquely obtained from the image. Such a problem may be avoided, for example, by changing the arrangement of the camera.

Further, in the above embodiment, the image of the nozzle included in the image is detected by pattern matching and the nozzle as the "positioning object" of the invention is the "imaging object" of the invention. However, the "imaging object" of the invention needs not be the same as the "positioning object". Specifically, an object can function as the "imaging object" of the invention if it is integrally displaced as the positioning object is displaced and the position of the positioning object is uniquely obtained by detecting the position of that object. For example, a marker for position detection may be provided on the arm having the nozzle attached thereto and this can be used as the "imaging object". In this case, since the shape of the marker can be freely determined, position detection can be more simply performed by setting a shape easily detectable from an image as the shape of the marker.

Further, in the operation of the above embodiment, the nozzle position calculation process to which the displacement detecting method according to the invention is applied is adopted to detect the positional displacement of the camera 72 and detect the positional displacement of the substrate W. However, the invention can be carried out independently of these positional displacement detection processes.

Further, the above embodiment relates to the substrate processing unit for processing the substrate using the nozzle as the positioning object of the invention. However, an application range of the displacement detection technique of the invention is not limited to substrate processing. Specifically, various objects effectively acting by being positioned at predetermined positions can be used as positioning objects and applied to techniques in general for detecting displacements of such positioning objects.

As the specific embodiment is illustrated and described above, the mover may be, for example, capable of positioning the positioning object at the reference position and the conversion information may express the correlative relationship in a neighborhood range including the reference position out of a movable range of the positioning object in the displacement detecting apparatus according to the invention. A vast amount of calculation is necessary to obtain the correlative relationship with the position in the image for the entire movable range of the positioning object and there are many application examples not requiring such a vast amount of calculation. If the correlative relationship is obtained only near the reference position out of the movable range, conversion is possible by a simple calculation and with sufficiently high accuracy in the neighborhood range.

In this case, if a plurality of reference positions are, for example, set, the neighborhood range is preferably set for each reference position. According to such a configuration, good conversion accuracy can be ensured near each reference position. Further, since it is sufficient that the correlative relationship is obtained for each neighborhood range and the conversion information is optimized, an increase of a calculation amount can be suppressed. A case where a plurality of reference positions are set for one positioning object and a case where a reference position is individually set for each of a plurality of reference positions are possibly examples of such a mode. In either case, the displacement of the positioning object near the reference position can be accurately detected for each positioning object and each reference position by setting the neighborhood range for each reference position and determining the conversion information.

Further, for example, the conversion information may be expressed by a polynomial having two or more degrees using the position coordinate of the imaging object in the image as a variable. Since the correlative relationship between the position of the imaging object detected in the image and the positioning object in the actual space is generally nonlinear, this relationship can be approximately expressed using an appropriate polynomial having two or more degrees. According to such a configuration, the displacement of the positioning object in the actual space can be easily obtained by substituting the position of the imaging object obtained in the image into the polynomial. If it is required to show a correlation effective only near the reference position, approximation is possible by a polynomial having a relatively small number of degrees.

Further, to determine the conversion information, the positioning object may be positioned at each of a plurality of imaging positions set in the predetermined neighborhood range including the reference position out of the movable range of the positioning object, the positions of the imaging object may be detected from a plurality of images obtained by performing imaging every time, and the conversion information may be obtained based on a relationship between the detected positions and the imaging positions. According to such a configuration, the images imaged with the positioning object positioned at the plurality of imaging positions set to include the reference position in the neighborhood range are obtained. The conversion information for obtaining the displacement of the positioning object in the actual space can be accurately obtained from the correlative relationship between the positions of the imaging object in those images and the known imaging positions.

As described above, this invention can be applied to techniques in general for detecting displacements of positioning objects using various objects effectively acting by being positioned at predetermined positions as the positioning objects.

Although the invention has been described in line with the specific embodiment above, this description is not intended to be interpreted in a restrictive sense. If the description of the invention is referred to, various modifications of the disclosed embodiment would be apparent to a person skilled in this art similarly to other embodiments of the invention. Therefore, attached claims are thought to include these modifications or embodiments without departing from the true scope of the invention.

What is claimed is:

1. A displacement detecting method for detecting a displacement of a nozzle from a reference position in a processing space of a processing apparatus, wherein the processing apparatus performs a predetermined processing on a processing subject held in a horizontal posture in the processing space, wherein the nozzle is moved horizontally along a moving path which has an arc shape and positioned to a plurality of positions on the movement path by a mover and discharges a processing liquid to the processing subject, the displacement detecting method comprising:

imaging an image including an imaging object by a imager using the nozzle in the processing space as the imaging object or using an object configured to be integrally displaced with the nozzle as the imaging object;

wherein the imager is disposed at a higher position than the processing subject and an imaging direction of the imager is set as a downwardly oblique direction toward the processing subject; and detecting the imaging object from the image imaged obliquely from above a movement path of the imaging object and detecting a displacement of the positioning object with respect to a predetermined reference position in the processing space based on a position of the imaging object detected in the image, wherein:

the position of the imaging object detected in the image is converted into a displacement of the positioning object with respect to the reference position in the processing space based on conversion information representing a correlative relationship between the position of the imaging object in the image and the displacement of the positioning object from the reference position in the processing space; and the conversion information is determined by a determining process performed in advance of the imaging, wherein in the determining process, the nozzle is positioned at each of a plurality of imaging positions whose displacements from the reference position in the processing space are known, set in a predetermined neighborhood range including the reference position out of a movable range of the nozzle in the processing space, and imaged at each of the plurality of imaging positions, the positions of the imaging object are detected from a plurality of images obtained by performing the imaging, the conversion information is obtained based on a relationship between the detected positions and the imaging positions, and the conversion information is expressed by a polynomial having two or more degrees using a position coordinate of the imaging object in the image as a variable.

2. The displacement detecting method according to claim 1, wherein the nozzle is capable of positioning at the reference position and the conversion information expresses the correlative relationship in a neighborhood range including the reference position out of a movable range of the nozzle.

3. The displacement detecting method according to claim 1, wherein in the determining process, out of position coordinates of the imaging object in the image, one position coordinate which has a larger difference among coordinate values of the imaging object detected in the plurality of the images is selected as the variable.

* * * * *